United States Patent

Blake

[15] 3,676,498
[45] July 11, 1972

[54] 1,6-BIS(2-OXACYCLOHEXYL)-HEXANE-1,6-DIONES AND A PROCESS FOR PRODUCING THEM

[72] Inventor: Stephen Blake, Fullwood, Preston, England

[73] Assignee: Pennwalt Corporation

[22] Filed: Jan. 14, 1969

[21] Appl. No.: 801,909

Related U.S. Application Data

[62] Division of Ser. No. 527,474, Feb. 15, 1966, Pat. No. 3,441,605.

[52] U.S. Cl. ................260/586 R, 260/31.8 C, 260/483, 260/537 R
[51] Int. Cl. ........................C07c 49/36, C07c 48/00
[58] Field of Search ...........................260/586 R

[56] References Cited

OTHER PUBLICATIONS

Hunig et al., " Berichte" Vol. 92, pp. 652– 662, (1959)

*Primary Examiner*—Leon Zitver
*Assistant Examiner*—Norman Morgenstern
*Attorney*—Carl A. Hechmer, Jr. and Stanley Litz

[57] ABSTRACT

A tetraketone of the formula

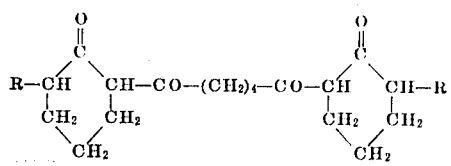

wherein the groups R are the same and each is H or $CH_3$, is produced by a process which comprises reacting adipoyl dichloride with at least a 100 percent excess over the stoichiometric proportion of an enamine of a cyclohexanone, the cyclohexanone having the formula

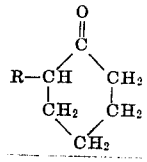

The tetraketone can be hydrolyzed to form a diketo-dicarboxylic acid of the formula

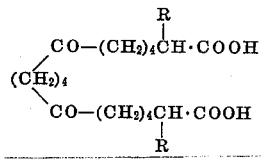

which is useful as a cross-linking agent for polymers.

6 Claims, No Drawings

1,6-BIS(2-OXACYCLOHEXYL)-HEXANE-1,6-DIONES AND A PROCESS FOR PRODUCING THEM

This application is a divisional of Ser. No. 527,474, filed Feb. 15, 1966, now U.S. Pat. No. 3,441,605.

The present invention relates to the production of organic acids and ketones and in particular to the production of novel diketo-dicarboxylic acids and salts and esters thereof, and of tetraketones which are useful as intermediates in producing the diketo-dicarboxylic acids.

According to the present invention, there is provided a diketo-dicarboxylic acid having the formula:

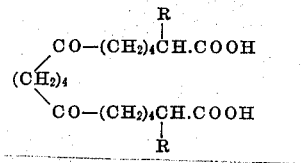

wherein the groups R are the same and each is H or $CH_3$; and carboxylic salts and esters thereof.

The present invention also provides a process of producing a diketo-dicarboxylic acid having the formula (I) which comprises hydrolyzing a tetraketone having the formula:

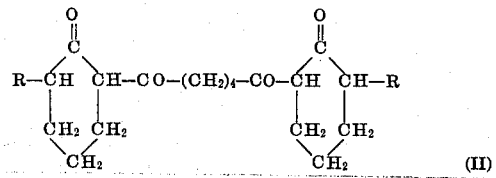

wherein the groups R are the same and each is H or $CH_3$.

The invention also comprises the tetraketones of formula (II) which are also new compounds.

The process of producing the diketo-dicarboxylic acid (I) is carried out, for example, by heating the tetraketone with aqueous alkali at a temperature sufficient to cleave both of the ring structures in the molecule of the tetraketone to produce the corresponding diketo-dicarboxylic acid. Preferably, the alkali is a solution of an alkali metal hydroxide. The process can be carried out using pure or substantially pure tetraketone, but more conveniently, the starting material may be the crude or partially purified tetraketone produced in a previous process, for instance by the reaction of an enamine of cyclohexanone or an enamine of a substituted cyclohexanone with adipoyl dichloride as hereinafter described. The hydrolysis of the tetraketone can be effected, for example, by heating the tetraketone or tetraketone-containing starting material with an aqueous alkali metal hydroxide solution at an elevated temperature, conveniently at the boiling point of the mixture under reflux conditions, but more advantageously at a lower temperature, for instance at a temperature of less than 40°C, for a sufficient time to cleave the tetraketone to yield the diketo-dicarboxylic acid. The reaction product may then be treated with an acid in a proportion at least sufficient to neutralize the excess alkali and so produce the free diketo-dicarboxylic acid.

The present invention also provides a process of producing a tetraketone (II) which comprises reacting adipoyl dichloride with an excess over the stoichiometric proportion of an enamine of a cyclohexanone, the cyclohexanone having the formula:

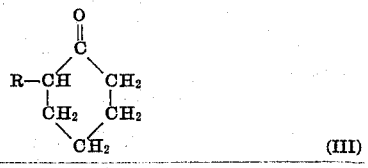

wherein the group R is H or $CH_3$.

The adipoyl dichloride employed in the process is prepared, for example, from adipic acid by any per se conventional method for producing acyl chloride from the corresponding carboxylic acid.

The enamine of a cyclohexanone (III) which is used in the process of producing a tetraketone (II) is preferably an enamine derived from a secondary amine. It is particularly preferred to use an enamine derived from a cyclohexanone (III) and a secondary cyclic amine, for example, morpholine. The adipoyl dichloride is preferably reacted with at least four molar proportions of the secondary amine enamine per molar proportion of the dichloride, so that there is at least sufficient of the enamine base present in the reaction mixture to bind the hydrogen chloride produced by the reaction. In this way it is not necessary to have present a hydrogen chloride-binding agent in addition to the enamine base present as a reactant, although an added binding agent may be present if desired.

The reaction of the adipoyl dichloride with the secondary amine enamine of the cyclohexanone to produce the tetraketone is carried out in an organic solvent, for instance dioxan, benzene or toluene, or other organic solvent which behaves similarly under the reaction conditions.

The reaction may be conveniently effected by slowly adding a solution of adipoyl dichloride in dry dioxan, with stirring, to a solution of the enamine of the cyclohexanone also in dry dioxan, subsequently stirring the mixture for a further period of time before boiling the mixture under reflux conditions for an extended period. The reaction mixture is then cooled and the hydrochloride of the enamine of the cyclohexanone which separates, filtered off and washed with dioxan. The filtrate together with washings is then hydrolyzed with mineral acid, for instance with dilute hydrochloric acid, and the mixture boiled under reflux conditions. The tetraketone product is then isolated by distilling off the dioxan solvent, extracting the distillation residue with a suitable organic solvent, for example diethyl ether, washing the solution free from acid, drying the solution and removing the solvent by distillation. If desired, the tetraketone product can be further purified for instance by recrystallization from a suitable solvent such as ethyl acetate.

The diketo-dicarboxylic acids and the tetraketones of the invention can be used as intermediates in the production of other organic compounds. The diketo-dicarboxylic acids are also useful, in the form of their alkyl esters, as plasticizers for vinyl chloride polymers or copolymers thereof and can be used as cross-linking agents in the production of synthetic polymeric materials.

The following Examples further illustrate the present invention. Parts by weight shown therein bear the same relation to parts by volume as do kilograms to liters. Percentages are expressed by weight unless otherwise stated.

EXAMPLE 1

92 parts by weight of adipoyl dichloride in 350 parts by volume of dry dioxan were slowly added to a stirred solution of 336 parts by weight of 1-morpholino-cyclohex-1-ene in 1,600 parts by volume of dioxan over a period of 60 minutes. When addition of the adipoyl dichloride was completed, the resulting mixture was stirred for a further period of 2 hours and the mixture was then boiled under reflux, with stirring, for 10 hours. The resulting product was cooled and the 1-morpholino-cyclohex-1-ene hydrochloride formed was filtered off. The solid was washed with dioxan. 680 parts by volume of 10 percent hydrochloric acid were added to the combined filtrate and washings and the mixture was boiled under reflux for 2 hours.

Dioxan was then removed by distillation at subatmospheric pressure and the residue was extracted with diethyl ether. The ethereal solution was washed with aqueous potassium bicarbonate solution and dried over anhydrous sodium sulphate. The ether was removed by distillation and after recrystallization of the semi-solid residue from ethyl acetate, there remained 37 parts by weight of 1,6-bis(2-oxocyclohexyl)hexane-1,6-dione having melting point 89° to 93°C. After further recrystallization from ethyl acetate, a sample was obtained with melting point 93° to 95°C and the following elemental analysis:

|  | found | calculated |
|---|---|---|
| carbon | 70.26% | 70.55% |
| hydrogen | 8.34% | 8.56% |

EXAMPLE 2

The tetraketone 1,6-bis(2-oxocyclohexyl)hexane-1,6-dione was prepared by the procedure described in the first paragraph of Example 1.

Dioxan was then removed from the resulting mixture by distillation at subatmospheric pressure and the residue was heated to 100° C. 460 parts by volume of hot 135 percent aqueous potassium hydroxide solution were added and the resulting mixture was heated for 5 minutes at 100° C. The product was then poured into a large excess of water, and washed with ether; excess hydrochloric acid was added in a proportion sufficient to neutralize the potassium hydroxide added and the mixture was allowed to stand for 10 hours. The crude 7,12-dioxo-octadecane-1,18-dioic acid produced was filtered off and recrystallized from ethyl acetate. The product had melting point 124° to 126°C and the following elemental analysis:

|  | found | calculated |
|---|---|---|
| carbon | 63.41% | 63.14% |
| hydrogen | 8.84% | 8.83% |

EXAMPLE 3

A solution of 32.2 parts by weight of adipoyl dichloride in 120 parts by volume of dry dioxan was added to a stirred solution of 127 parts by weight of 1-morpholino-6-methyl-cyclohex-1-ene in 600 parts by volume of dry dioxan over 30 minutes in an atmosphere of dry nitrogen. The mixture was stirred at 15°C for 1 hour and then refluxed for 10 hours. The solid was filtered off and washed with dioxan, the dioxan washings were then combined with the dioxan filtrate.

The whole dioxan solution was treated with 10 percent aqueous hydrochloric acid and refluxed for 2 hours. The solvents were then distilled off to give 80 parts by weight of a semi-solid product containing 1,6-bis(2-oxo-3-methyl-cyclohexyl)hexane-1,6-dione which could be recovered and purified by the procedure described in Example 1. To this material, when cool, was added a solution of 88 parts by weight of potassium hydroxide in 64 parts by volume of water; the mixture was then stirred for 4 hours at 15°C. 800 parts by volume of water were added and the whole resulting mixture was extracted with ether. The aqueous layer obtained was acidified and again extracted with ether. The product was obtained by distilling off the ether and recrystallizing first from ether and then from petroleum ether (boiling point range 60° to 80°C), being 0.7 part by weight of 2,17-dimethyl-7,12-dioxo-octadecane-1,18-dioic acid of melting point 92° to 93°C and the following elemental analysis:

|  | found | calculated ($C_{20}H_{34}O_6$) |
|---|---|---|
| carbon | 64.57% | 64.84% |
| hydrogen | 9.33% | 9.25% |

EXAMPLE 4

The tetraketone 1,6-bis(2-oxocyclohexyl)hexane-1,6-dione was prepared by the procedure described in the first paragraph of Example 1.

Dioxan and water were then removed until the residue became a crude granular solid. This solid was then added to a cool, stirred solution of 260 parts by weight of potassium hydroxide in 190 parts by volume of water, the temperature being kept below 40°C. After stirring the mixture for 4 hours, the solution was diluted by adding 1,300 parts by volume of water and the diluted solution was filtered and acidified with concentrated hydrochloric acid.

The product which was filtered off, dried and recrystallized from ethyl acetate, was 7,12-dioxo-octadecane-1,18-dioic acid having melting point 120° to 122°C and the following elemental analysis:

|  | found | calculated ($C_{18}H_{30}O_6$) |
|---|---|---|
| carbon | 62.97% | 63.14% |
| hydrogen | 8.64% | 8.83% |

92 parts by weight of the crude product were obtained (representing a yield of 54 percent theoretical) and the purified product amounted to 56 parts by weight (representing a yield of 33 percent).

150 parts by weight of 1-morpholino-cyclohex-1-ene hydrochloride were recovered.

EXAMPLE 5

A solution of adipoyl chloride (92 parts by weight) in dry benzene (350 parts by volume) was added to a stirred solution of 1-morpholinocyclohex-1-ene (336 parts by weight) in dry benzene (1600 parts by volume) over a period of 60 minutes under dry nitrogen. During the addition the temperature of the reactants rose from 16° to 30°C. The resulting mixture was stirred for a further 2 hours, then boiled under reflux with stirring for 6 ¾ hours.

The resulting product was cooled and the 1-morpholino-cyclohex-1-ene hydrochloride formed was filtered off and washed with benzene. The solvent on the combined filtrate and washings was removed by rotary evaporation. The residue was dissolved in ethanol (250 parts by volume), water (250 parts by volume), concentrated hydrochloric acid (250 parts by volume), and the mixture was boiled under reflux for 2 ½ hours.

After this time the solution was cooled, the ethanol/water was removed by distillation until the temperature of the boiling liquid was about 100°. The residue was cooled; a solid separated and was filtered off. The liquor was then extracted with di-isopropyl ether (500 parts by volume). The ether extract was washed with water (500 parts by volume) then 250 parts by volume of water was added, followed by sodium bicarbonate to neutralize any excess acid. The ether extract was finally washed again with water (2 × 200 parts by volume) and allowed to dry over anhydrous sodium sulphate. The di-isopropyl ether was finally removed by distillation to yield a light brown liquid (86 parts by weight).

This liquid was allowed to stand at 0°C and crystallized to a yellow greasy solid, which was filtered to yield a pale yellow solid and a brown liquor. The solid was extracted with petroleum ether (B.P. 40°–60°C). The residue was substantially adipylcyclohexanone (18.2 parts by weight). A sample of this product was recrystallized from ethyl acetate three times to give pure adipoylcyclohexanone having melting point 96°-98 °C and the following elemental analysis:

|  | found | calculated |
|---|---|---|
| carbon | 70.33% | 70.55% |
| hydrogen | 8.49% | 8.56% |

A further 8.0 parts by weight of crude adipoylcyclohexanone crystallized from the petroleum extract.

EXAMPLE 6

A solution of adipoyl chloride (92 parts by weight) in dry toluene (350 parts by volume) was added to a stirred solution of 1-morpholinocyclohex-1-ene (336 parts by weight) in dry toluene (1,600 parts by volume) over a period of 60 minutes under dry nitrogen. During the addition the temperature of the reactants rose from 16° to 30°C. The resulting mixture was stirred for a further 2 hours, then boiled under reflux with stirring for 6 ¾ hours.

The resulting product was cooled and the 1-morpholino-cyclohex-1-ene hydrochloride formed was filtered off and washed with toluene. The solvent on the combined filtrate and washings was removed by rotary evaporation. The residue was dissolved in ethanol (250 parts by volume), water (250 parts by volume), concentrated hydrochloric acid (250 parts by volume) and the mixture was boiled under reflux for 2 ½ hours.

After this time the solution was cooled, the ethanol/water was removed by distillation until the temperature of the boiling liquid was about 100°C. The residue was cooled; a solid separated and was filtered off. The liquor was then extracted with di-isopropyl ether (500 parts by volume). The ether extract was washed with water 500 parts by volume), then 250 parts by volume of water was added followed by sodium bicarbonate to neutralize any excess acid. The ether extract was finally washed again with water (2 × 200 parts by volume) and allowed to dry over anhydrous sodium sulphate. The di-isopropyl ether was finally removed by distillation to yield a brown liquid (63.7 parts by weight).

This liquid was allowed to stand at 0°C and crystallized to a greasy solid, which was filtered to yield a pale brown solid and a dark brown liquor. The residue was washed with cold ethyl acetate to yield crude adipoylcyclohexanone (9.5 parts by weight), a sample of which was recrystallized twice from ethyl acetate to yield adipoylcyclohexanone having melting point 94°–98°C.

What we claim is:

1. A tetraketone having the formula:

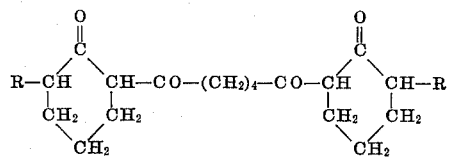

wherein the groups R are the same and each is a member selected from the group consisting of H and CH₃.

2. A tetraketone according to claim 1, wherein each R is H, said tetraketone being 1,6-bis(2-oxocyclohexyl)-hexane-1,6-dione.

3. A tetraketone according to claim 1, wherein each R is CH₃, said tetraketone being 1,6-bis(2-oxo-3-methylcyclohexyl)hexane-1,6-dione.

4. A process of producing a tetraketone having the formula

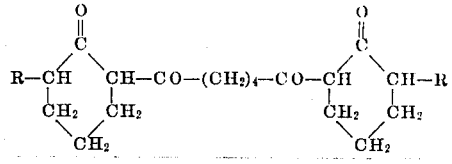

wherein the groups R are the same and each is a member selected form the group consisting of H and CH₃, which comprises reacting adipoyl dichloride with an enamine of a cyclohexanone and morpholine, there being at least four molar proportions of the enamine per molar proportion of the adipoyl dichloride, the cyclohexanone having the formula:

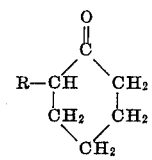

wherein R is as precedingly defined, and hydrolyzing with mineral acid to produce the tetraketone.

5. A process as claimed in claim 4, wherein the reaction is carried out in dioxan, as organic solvent.

6. A process as claimed in claim 4, wherein the reaction is carried out in an organic solvent selected form the group consisting of benzene and toluene.

* * * * *